Aug. 6, 1929.  W. O. STOUT  1,723,820
MAP HOLDER
Filed March 30, 1928  2 Sheets-Sheet 1

Inventor
Wilfred Oakley Stout
By Nora Fisher
Attorney

Aug. 6, 1929.     W. O. STOUT     1,723,820
MAP HOLDER
Filed March 30, 1928     2 Sheets-Sheet 2
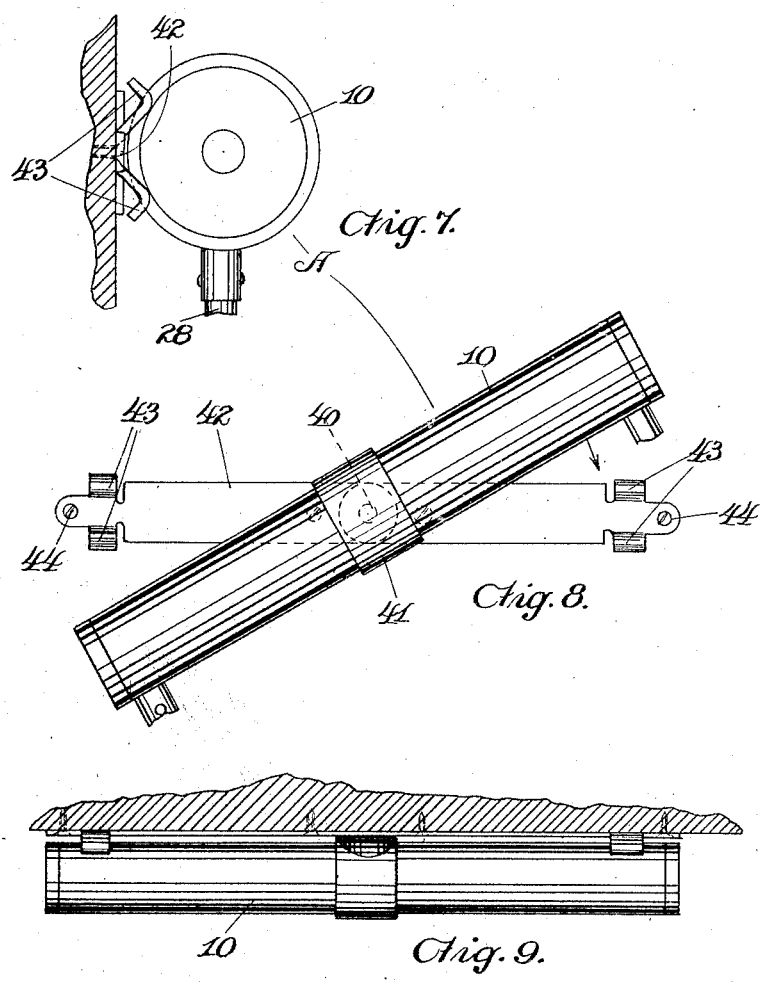
Wilfred Oakley Stout, Inventor Patented Aug. 6, 1929.

1,723,820

UNITED STATES PATENT OFFICE.

WILFRED OAKLEY STOUT, OF ST. PAUL, MINNESOTA.

MAP HOLDER.

Application filed March 30, 1928. Serial No. 265,894.

My invention relates to a map holder wherein the primary object is to provide a holder for maps which is adapted to receive different map rolls and to provide a casing wherein the roll is concealed and protected when it is not desired for use. It is also a feature of my invention to provide maps in roll form which may be easily slipped into a casing designed to hold the same and thus providing a series of maps adapted to be used with a particularly designed casing having a purpose to be more particularly used in conjunction with automobiles, as reference or road maps to indicate the roads and highways. The tourist may supply himself with one of my map casings and a series of road or State maps when he is touring, and then by placing the map desired in the casing, easy reference may be made to the same at any time by pulling the map out of the casing sufficiently to refer to the desired place on the same.

It is also an object to provide a means carried by the casing adapted to form a guide for the free edge of the map to hold the same in place when it is pulled out for use. The guide means forms with the edges of the map a brace for holding the map in stretched out position when pulled out of the casing between the guides. This guide means prevents the maps from being torn in use and the guide is so constructed as to be folded up when not desired for use. In this manner I provide a compact map holder and a particularly designed map roll adapted to be used with the same.

My invention includes a holder and map roll which may be rotated and inverted so that either side of the map may be referred to. This is accomplished by a holder for the map roll which may be turned over and shifted so as to permit both sides of the map to be used for map data, outline and reference. In this manner I can make the illustrations on the map much larger owing to the fact that both sides of the map may be used.

My holder includes a cylindrical member which is adapted to be held by bracket supporting means which permits the holder cylinder to be rotated so that either side of a map held in the cylinder may be referred to. This is accomplished quickly by turning the cylinder either to one side or the other.

These features and objects, together with other details of the invention will be more fully and clearly set forth hereinafter in the specification and claims.

In the drawings forming part of my specification:

Figure 7 is a side view of another form of my map holder which permits the holder to be reversed.

Figure 8 is a front view of the map holder cylinder, being partly turned in the support so as to show the manner in which the same is rotated to permit reference to either face of the map.

Figure 9 is a plan view showing the map holder of the construction illustrated in Figures 7 and 8.

Figure 1:
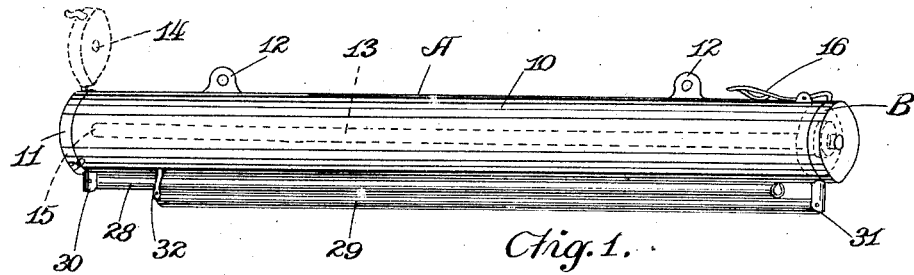
Figure 1 is a perspective view of my map casing as it would appear folded up and when a map is concealed within the same.
Figure 2:
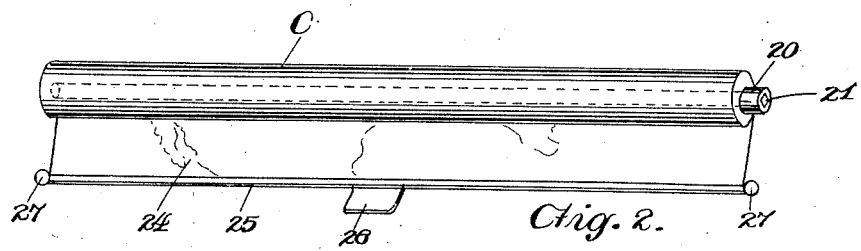
Figure 2 is a perspective view of one of the map rolls, removed from the casing.

In the drawings my map holder A is designed with a tubular casing 10 having a ratchet mechanism B within one end of the casing and a cover 11 hingedly supported to the other end adapted to close the map receiving end of the casing 10.

The tubular casing 10 of my map holder A is provided with supporting loops 12 which permit the holder to be attached to the dashboard of an automobile or to any other convenient place so that the holder A may be placed in such a position as to provide a ready reference when it is desired. It is not necessary to attach the map holder to any particular part of the automobile as the same may be used for reference to the map held therein without attaching it, as will be more fully hereinafter described.

Figures 4, 5, 6:
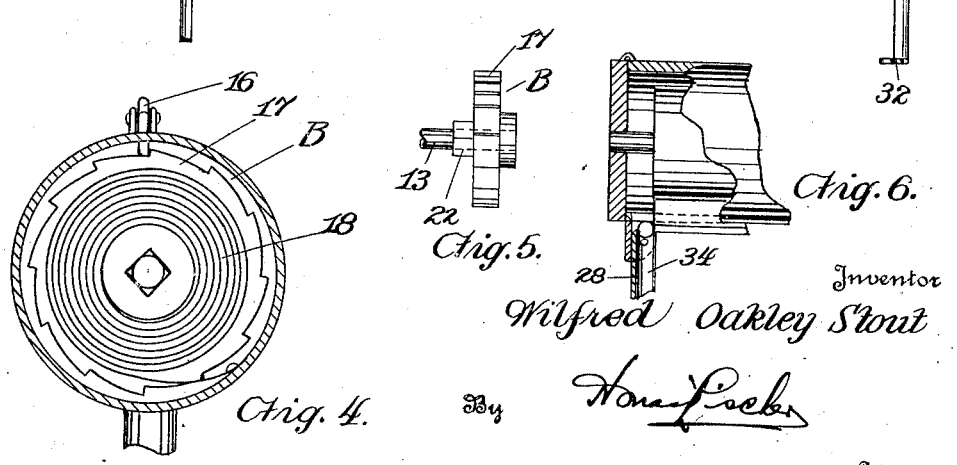
Figure 4 is an end view of the ratchet of my map holder, with the end of the casing removed to disclose the same.
Figure 5 illustrates a detail of the ratchet mechanism removed from the casing.
Figure 6 is an end sectional detail of a portion of my map holder.

The tubular casing 10 is provided with an axially extending supporting rod 13 which extends from the ratchet mechanism to the cover 11. The cover 11 is provided with an axial bearing 14 for the free end 15 of the map supporting rod 13. The ratchet mechanism B is inclosed within the casing 10 and is more clearly illustrated in the end view of Figure 4. The ratchet is provided with a spring pawl 16 which is adapted to engage with the ratchet teeth 17 of the mechanism B and by means of the spring 18 when a map is placed within the casing 10 and engages with the ratchet mechanism B, the drawing of the map out of the casing for reference winds up the spring 18. When it is desired to return the map to its normal inclosed position within the casing 10, it is only necessary to depress the pawl 16 which releases the ratchet teeth, permitting the spring 18 to wind up the map on the supporting rod 13.

The map rolls C are of a particular nature being provided with a tubular member 20 extending through the axis of the roll C and so formed as to fit over the rod 13 when the map C is slid into the casing 10.

The tubular member 20 of the roll C is provided with an angular socket 21 in the end thereof which is adapted to engage the shoulder 22 of the ratchet mechanism B, which is integral with the supporting rod 13 and the teeth 17, so as to cause the map roll C to be operated by the ratchet mechanism B. Each of the rolls C have the free end 24 of the map bound by the member 25. A suitable tab 26 may be provided connected to the member 25 so as to permit the easy pulling of the map from the casing 10. The ends of the member 25 are formed into a ball portion 27 which are adapted to provide a means of guiding the sides of the free edge of the map C when it is in use. The casing 10 is formed with tubular guide members 28 and 29 which are hingedly supported at 30 and 31 respectively. The guide members 28 and 29 are normally folded up against the casing 10 to lie longitudinal to and parallel with the casing. The free end of the tubular guide member 29 is formed with a spring catch 32 which engages over the member 28 so as to hold the guide members 28 and 29 in folded position. When the guides 28 and 29 are desired for use they are opened out into the position illustrated in Figure 3. The guides 28 and 29 are tubular or channel shape and are adapted to receive the ball ends 27 of the free edge 24 of the map C in use.

Figure 3:
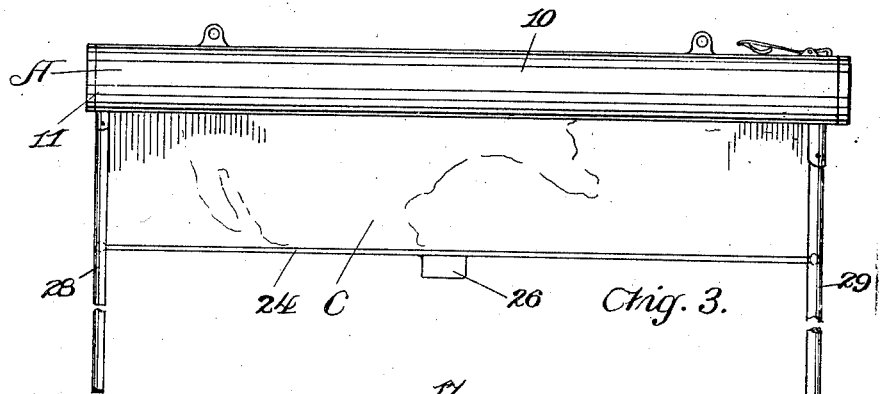
Figure 3 is a front view of my map holder with the map partly withdrawn from the casing and as it would appear in use.

With my map holder A the tourist may supply himself with a series of maps C representing different States, Territories, and roads, or other information upon the roll C to which he wishes to refer from time to time. These maps may be carried in any suitable container, either individual boxes or casings of a tubular nature, or the maps may be sold with a single holding casing 10 and a container for holding, say six or more maps. The casing 10 is then set up for use and the desired map or roll C is inserted into the casing 10 by opening the cover 11 and slipping the map C over the supporting rod 13. The cover 11 is then snapped shut and when the map is desired for use the guides 28 and 29 are lowered into position to permit the ball ends 27 to slide within the guides 28 and 29. These guides 28 and 29 are shaped to engage over the ball ends 27 and thus hold the guides 28 and 29 in virtually right angular position with the casing 10, as illustrated in Figure 3. The formation of the balls 27 engaging in a groove in the guides 28 and 29 are of a nature to hold the balls 27 from disengagement from the guides and thus the map C may be held drawn out of the casing 10, as illustrated in Figure 3, with the free edge 24 of the map held against being torn or flapping in the wind. The balls 27 cannot become disengaged from the grooves 34 in the guides 28 and 29. Thus the free edge 24 of the map is held between the guides and the guides are also held in virtually rectilinear nature, while the map C is drawn out of the casing 10 for reference. After the map has been referred to it can be readily rewound into the holder A by merely operating the pawl 16 to disengage the teeth 17, whereupon the spring 18 rewinds the map on the supporting rod 13.

My map or reference holder provides a very convenient means for tourists for using road or State maps or other reference of a similar nature in a practical manner. Heretofore these maps have ordinarily been put out in a flat or folded state and to open them out for reference is very awkward and unsatisfactory for the tourist. I overcome these difficulties and provide a simple, effective map holder of a tubular or cylindrical nature wherein a different map roll may be easily placed within the casing 10 at will, and the folding guides provide a means of protecting and holding the free edges of the map so that the map can be drawn out very quickly for reference or can be rewound into a compact state and the guides folded up out of the way when they are not desired for use.

My map holder A is designed either of the plain, simple form illustrated in Figures 1 to 6, inclusive, or of the construction illustrated in Figures 7 to 9, inclusive. In Figures 7 to 9 I have illustrated my map holder A adapted to be supported centrally by the pivot member 40 which engages the band 41 extending about the cylinder 10 so as to hold the cylinder in a manner so that it can be rotated on the pivot 40 and can also be rotated in the band 41.

The pivot member 40 is adapted to hold the cylinder 10 to the supporting member 42 which is provided with spring fingers 43 on each end thereof which are adapted to engage the sides of the cylinder 10 to hold the same in line with holder 42 while the map holder A is being held in operative position. The spring fingers 43 hold the map cylinder 10 steady while it is in use. When it is desired to refer to the opposite side of the map C the cylinder 10 is rotated on the pivot 40 until the spring fingers 43 engage the cylinder to hold the same in line with the holder 42, and then the cylinder is rotated in the band 41 to bring the guide members 28 and 29 into lowermost position and the map holder A is then ready to be operated so that the map C can be referred to.

The holder 42 may be attached by the screws 44 to the instrument board of an automobile or any other suitable place so that reference may be easily made to the map C.

The holder 42 permits my map holder A to be used so that larger illustrations may be made on each side of the map face C and either side of the map may be easily and readily referred to by rotating the cylinder in the holder 42 into the desired position.

My map holder A may be used for advertising purposes wherein advertising may be placed upon the casing A and the maps or roll C are supplied for the convenience of the tourist at virtually a very small cost or to be given away to tourists. It is an important feature of the invention to provide a holder of a simple, inexpensive nature so that it may be used for an advertising medium.

In accordance with the patent statutes I have described the principles of operation of my holder for roll and reference maps and while I have illustrated a particular formation and construction of the parts, I desire to have it understood that the same are only illustrative of a means of carrying out the invention and the same may be applied to other uses and variations may be made within the scope of the following claims without departing from the spirit of the same.

I claim:

1. A map holder including, a tubular casing, a ratchet winding means concealed within one end of said casing, a supporting rod extending from and fixed to said winding means, and a map adapted to be supported by said rod within said casing in a manner to cause said ratchet means to rewind said map when the same is pulled out for reference.

2. A map holder including, a tubular concealing casing for a map, a map roll having an axial opening extending therethrough, a rod within said casing for detachably supporting said map roll and extending through said opening in said map roll, and guides for the free edges of said map foldable when not desired for use.

3. An automobile map holder comprising, a tubular casing, an axial rod within said casing, a spring ratchet for actuating said rod, a map roll adapted to fit over said rod, and a removable closure for the end of said casing to permit the insertion and removal of the map roll.

4. A map and holder for automobiles including, a concealing casing, a map roll, means for detachably supporting said map roll within said casing, a spring actuated ratchet for rewinding the map roll, guides for the free edges of the map roll, and means cooperating with said guides carried by the free edges of said map roll to space the guides apart and to hold the free edges of the map against disengagement from said guides.

5. A road map support including, a tubular body, a spring ratchet held within one end of said body, a supporting member projecting from said ratchet, a removable closure for said tubular body to permit the insertion of a map roll, and foldable guides carried by said body adapted to support and guide the free edge of the map roll.

6. A map supporting device including, a body portion adapted to conceal a map therein, means for removing said map, means within said body for drawing the map into the body after it has been drawn out of the body for reference, guide means carried by said body for the edges of the map, and means for holding said guide means folded adjacent the body to provide a compact map holder.

7. A map support for automobiles including, a casing, an opening in said casing for receiving a map roll, a spring ratchet for actuating the map roll out of operating position, channel shaped guide members pivotally supported by said casing in a manner to fold therewith, a map roll, and engaging means formed on said map roll at the free edge of the same adapted to engage in said guide members to freely slide therein and held against transverse disengagement therefrom for holding the free edge of the map steady when the map is in use and extending from said casing.

8. The combination of a map roll and casing for supporting and concealing the same including, a tubular body for concealing the map roll, a removable closure for one end of said body, so that the map roll may be removed therefrom, a spring ratchet carried in the other end of said body to actuate said map roll, a map roll adapted to be inserted in said tubular body, and guide members for the free edges of said map roll to hold the same steady when in use.

9. The combination of a map supporting means and a roll map including, a casing for supporting different roll maps to individually hold the same for reference, a longitudinal slot in said casing, guides supported by said casing and adapted to fold over said longitudinal slot when not desired for use, and a roll map including ball engaging ends adapted to engage in said guide members when said map is pulled out for inspection and thereby provide means for holding the free edge of said map steady while in use.

10. The combination of a casing and a roll map, a tubular body portion forming said casing adapted to hold a single roll map, means for supporting said roll map within said casing to permit changing of said map for other maps similarly formed, spring ratchet means for winding up said maps positioned within one end of said casing, a closure for the other end of said casing, and guide means supported by said casing adapted to depend therefrom when desired for use to guide the free edges of the map roll held in said casing and to fold out of operative position when not desired for use.

11. A map holder including, a cylindrical casing, means within said cylindrical casing adapted to support a map carried by said casing for said map, means for supporting said cylindrical casing in a manner so that it can be rotated to permit reference to either side of the map held therein, and means for holding said casing in fixed horizontal position.

12. An auto road guide map and support including, means for concealing the map when not in use, means for pivoting said concealing means to permit either side of the map to be referred to, and spring fingers for holding the concealing means rigid while in operative position.

WILFRED OAKLEY STOUT.